(12) United States Patent
Khalil et al.

(10) Patent No.: US 9,860,378 B2
(45) Date of Patent: Jan. 2, 2018

(54) BEHAVIORAL PERFORMANCE ANALYSIS USING FOUR-DIMENSIONAL GRAPHS

(71) Applicant: Verizon Patent and Licensing Inc., Basking Ridge, NJ (US)

(72) Inventors: Manah M. Khalil, Coppell, TX (US); Ehssan Ghanem, Highland Village, TX (US); Vijaya R. Challa, Irving, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 350 days.

(21) Appl. No.: 14/035,174

(22) Filed: Sep. 24, 2013

(65) Prior Publication Data

US 2015/0086003 A1  Mar. 26, 2015

(51) Int. Cl.
*H04M 3/00* (2006.01)
*H04M 3/51* (2006.01)
*H04M 5/00* (2006.01)
*H04L 12/66* (2006.01)

(52) U.S. Cl.
CPC .... *H04M 3/5175* (2013.01); *H04M 2203/402* (2013.01); *H04M 2203/556* (2013.01)

(58) Field of Classification Search
CPC .. H04M 3/493; H04M 1/271; H04M 2201/40; H04M 2201/41; H04M 3/2218; H04M 3/42221; H04M 3/4936; H04M 3/5175; H04M 3/5183; H04M 3/5232; H04M 1/72572; H04M 3/5133; H04M 3/523; H04M 3/5233; H04M 3/42042; H04M 3/42; G06Q 10/06; G06Q 30/0609; G06Q 10/063; G06Q 10/063112; G06Q 10/0637; G06Q 10/0639; G06Q 10/105
USPC ............ 379/265.03, 265.05, 265.09, 265.11, 379/265.12; 370/352
See application file for complete search history.

(56) References Cited

U.S. PATENT DOCUMENTS

| | | | |
|---|---|---|---|
| 6,978,006 B1 * | 12/2005 | Polcyn ............... | G06Q 10/0631 379/265.05 |
| 8,200,527 B1 * | 6/2012 | Thompson ......... | G06Q 10/0639 705/7.38 |
| 2003/0144868 A1 * | 7/2003 | MacIntyre ........ | G06F 17/30536 705/7.38 |
| 2003/0154072 A1 * | 8/2003 | Young ............... | G06F 17/30017 704/9 |

(Continued)

*Primary Examiner* — Md S Elahee
*Assistant Examiner* — Kharye Pope

(57) ABSTRACT

Systems and methods described herein enable call center managers to identify behavioral drivers for improving call agents' performance. A computing device obtains call data for multiple calls received at a call center and plots individual calls of the multiple calls, based on the call data, against three behavioral measures related to agent activities. The computing device identifies an optimal zone, among the plotted individual calls, for a selected performance metric value over the three behavioral measures. The computing device also plots a particular agent's calls, based on the call data, against the three behavioral measures and identifies an agent's zone, among the plotted agent's calls, for the selected performance metric value. The computing device generates a visual model of the optimal zone and the agent's zone within the context of the three behavioral measures.

20 Claims, 11 Drawing Sheets

(56) References Cited

U.S. PATENT DOCUMENTS

| | | | |
|---|---|---|---|
| 2006/0203991 A1* | 9/2006 | Kramer | H04M 3/5175 379/265.06 |
| 2007/0071206 A1* | 3/2007 | Gainsboro | H04M 3/2281 379/168 |
| 2007/0073572 A1* | 3/2007 | McLaughlin | G06Q 10/06 705/7.15 |
| 2009/0323921 A1* | 12/2009 | Spottiswoode | H04M 3/5232 379/265.12 |
| 2010/0125433 A1* | 5/2010 | Jordan | G06Q 10/047 702/155 |
| 2011/0206198 A1* | 8/2011 | Freedman | G06Q 30/06 379/265.03 |
| 2013/0251137 A1* | 9/2013 | Chishti | H04M 3/5232 379/265.11 |

* cited by examiner

BEHAVIORAL PERFORMANCE ANALYSIS USING FOUR-DIMENSIONAL GRAPHS

BACKGROUND

Companies often use call centers to address customer inquiries, take customer orders and/or resolve customer problems. Businesses may use Interactive voice response (IVR) systems to obtain caller information without human intervention, but, in many cases, calls are eventually answered by an agent.

DETAILED DESCRIPTION OF PREFERRED EMBODIMENTS

The following detailed description refers to the accompanying drawings. The same reference numbers in different drawings may identify the same or similar elements.

The performance of call center agents may be monitored and evaluated using various metrics. For example, in some systems, the average handling time (AHT) or first call resolution (FCR) may provide quantitative performance indicators for an agent. Other systems use qualitative metrics, such as customer survey results or customer satisfaction scores, used as performance indicators for an agent. However, such quantitative and qualitative metrics do not necessarily provide good feedback for how to improve an agent's overall performance. In some cases, different metrics may even provide contradictory indicators for how to manage future calls. For instance, attempting to reduce overall AHT can result in the decrease of FCR, as customers may call again to resolve an ongoing issue. Conversely, attempting to increase the FCR may require the agents to spend more time on the calls, and therefore increasing the AHT.

Systems and methods described herein enable call center managers to identify behavioral drivers for improving call agents' performance. In one implementation, three behavioral measurements for call agents may be correlated to a desirable performance metric value, such as a range of after call survey (ACS) scores or first call resolution (FCR). Data from multiple calls (and multiple call agents) having the desirable performance metric value may be plotted against the three behavioral measurements to identify an optimal zone (or target zone) for agent behaviors. The optimal zone may be graphically presented in the context of the three behavioral measurements. A fourth dimension, which is the selected desirable performance metric, may be represented as the color of the data point. Call data for the individual agent calls may then be plotted against the same three behavioral measurements to identify an agent's zone. A visual model depicting the agent's zone and optimal zone may be generated. In one implementation, the visual model may provide a qualitative indication of actionable drivers, based on the three behavioral measurements, that may be used to coach agent performance based on the relative positions of the agent's zone and the optimal zone. In another implementation, the visual model may provide a quantitative analysis of an agent's performance based on, for example, the resultant intersecting volume of the agent's zone and the optimal zone.

Figure 1:
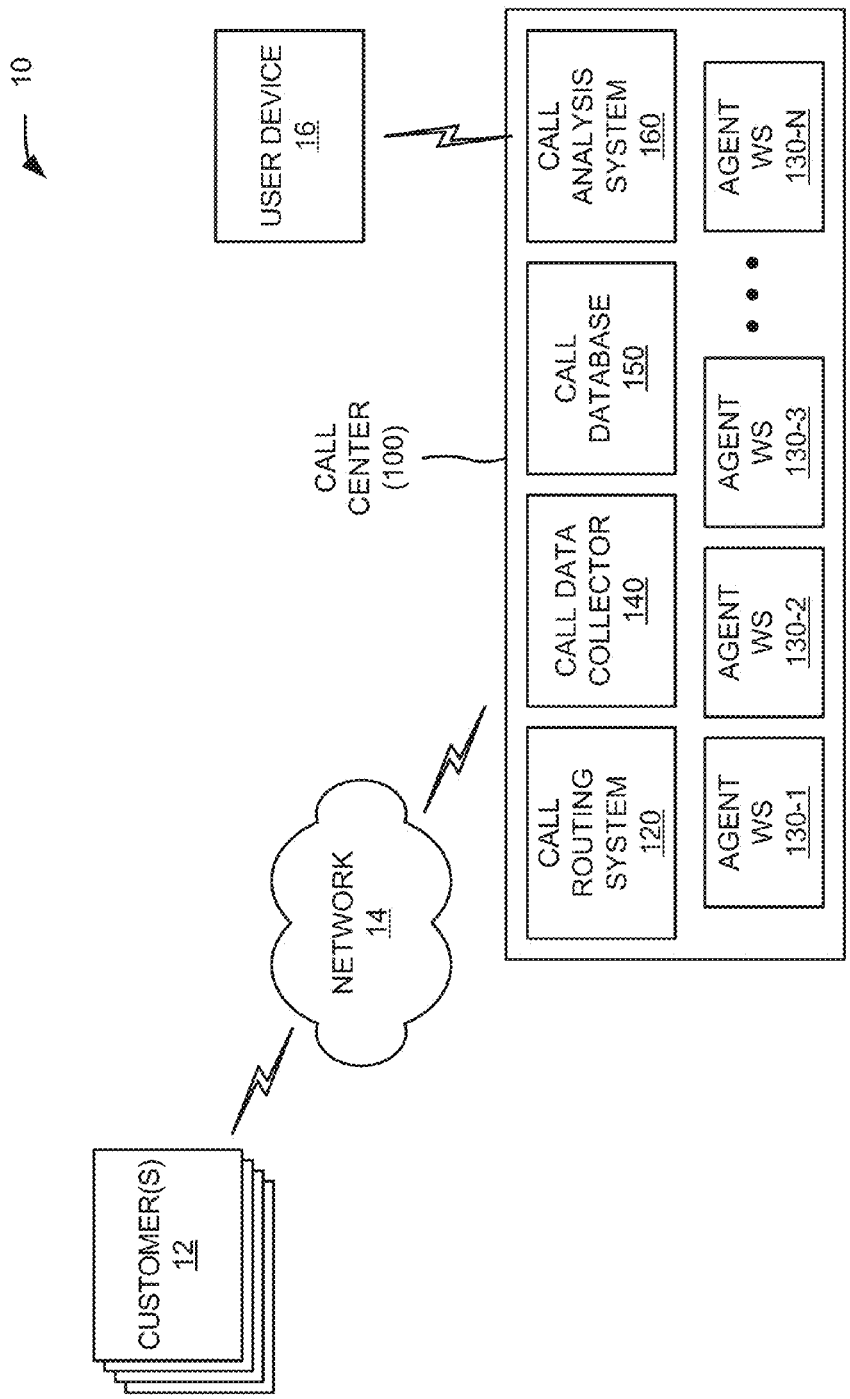
FIG. 1 is an exemplary environment in which systems and/or methods described herein may be implemented.

FIG. 1 provides an exemplary environment 10 in which systems and/or methods described herein may be implemented. As shown in FIG. 1, environment 10 may include a call center 100 that handles calls from customers 12 via network 14. As described further herein, one or more components of call center 100 may also communicate with a user device 16.

Call center 100 may represent a call center configured to receive and handle a large volume of calls from customers 12. Call center 100 may include a call routing system 120, agent workstations (WSs) 130-1 through 130-N (referred to collectively as agent WSs 130 or individually as agent WS 130), a call data collector 140, a call database 150, and a call analysis system 160. Call center 100 may be implemented in a single location or as a distributed computing environment.

Call routing system 120 may distribute calls received at call center 100 to one of agent WSs 130. In some implementations, call routing system 120 may be included within a voice portal with an interactive voice response (IVR) unit that interacts with callers to obtain information associated with the call. In each case, call routing system 120 may forward calls to an available one of the agent WSs 130.

Agent WSs 130 may represent a workstation/computer and/or operator. Agent WSs 130 may be used to handle calls that require human intervention. In an exemplary implementation, agent WSs 130 may be associated with call routing system 120. In addition, in an exemplary implementation, agent WSs 130 may be connected to call routing system 120 via a network, such as LAN within call center 100. In alternative implementations, agent WSs 130 may be connected directly to call routing system 120, via a private network, etc.

Agent WSs 130 may include a workstation or computer, such as a personal computer or laptop. Agent WSs 130 may also include any device capable of performing IP based messaging, such as VoIP, to transmit/receive voice, video and/or text. Agent WSs 130 may also include any telephone device (not shown) to place and receive telephone calls. For example, the telephone device may be a standard telephone, a cordless telephone, a cellular telephone or any other type of telephone. The telephone device may also include any type of device that is capable of transmitting and receiving voice signals to/from a data network. For example, the telephone device may include any client, such as a computer device, a web-based appliance, etc., that is configured to provide telephone functions. The telephone device may, for example, be a SIP-based telephone device. In this case, the SIP-based telephone device may take the form of a stand-alone device, e.g., a SIP telephone designed and configured to function and appear like a conventional telephone. A SIP-based telephone device may also include a software client that may run, for example, on a conventional PC, laptop computer or other computing device. In one implementation, agent WSs 130 may include monitoring features to track activity during a call, such as, for example, voice input from an agent, voice input by a customer, keystroke activity by an agent, call duration, etc.

Call data collector 140 may extract and/or collect data from WSs 130. For example, call data collector 140 may manage data collection so that behavioral measurements may be analyzed. Call data collector 140 may collect talk times, keystroke activity, survey scores, a ticket number, an agent ID, etc., associated with each particular call. During its operation, call data collector 140 may format collected data for storage in call database 150. Call data collector 140 may also collect agent profile information that is not directly associated with a call. For example, agent information such as training hours, a geographical region, a division, etc. may be collected by call data collector, formatted, and/or stored in call database 150.

Call database 150 may include one or more databases or other data structures to store call data associated with individual WSs 130 and/or individual agents. Call database 150 may store formatted data received from call data collector 140 and/or other data (e.g., agent profile data) from other sources. In one implementation, call database 150 may also store data retrieved from and/or used by call analysis system 160.

Call analysis system 160 may apply data from call database 150 to identify coaching models and develop visual representations. In one implementation, call analysis system 160 may apply certain behavioral measurements (e.g. selected from a group of behavioral measurements) associated with individual calls to plot a correlation of the behavioral measurements to a desirable performance metric value. Behavioral measurements associated with a call may include data from measurement of behavioral characteristic/pattern that can be controlled by an agent. Behavioral measurements include, for example, call handling time, agent-to-customer talk time, customer-to-agent talk time, agent silent time, agent training/experience, or agent workstation/computer activity during a call. Examples of a desirable performance metric value associated with a call may include a particular ACS score or a first-call resolution (FCR) indicator. Call analysis system 160 may identify benchmark behavioral measurements that correlate with the desirable performance metric value. As described further herein, call analysis system 160 may provide a graphical representation of the benchmark behavioral measurements and plot individual agent call data against the benchmarks (referred to herein as an optimal zone). For example, call analysis system 160 may be directed to correlate behavioral measurements for a particular range of ACS scores. Call analysis system 160 may plot each call with the desirable ACS score, using behavioral measurements for call handling time, agent-to-customer talk time, and agent training/experience.

Call analysis system 160 may also plot an individual agent's calls using the same behavioral measurements that were used to identify the optimal zone. As described further herein, an agent's zone may also be identified. In one implementation, the visual model may be provided to identify (e.g., via color-coding) calls with desirable ACS scores, the optimal zone, and/or the agent's zone. In one implementation, call analysis system 160 may provide both qualitative and quantitative analysis based on information in the visual model.

Customers 12 may use user devices (e.g., telephones, smart phones, computers, etc.) to place voice or video calls to call center 100. In another implementation, customers 12 may use devices to conduct interactive chat sessions with WSs 130. Customers 12 may provide feedback for a particular call experience with call center 100/WS 130. For example, customers 12 may submit an after-call survey to relate the customer's level of satisfaction with a call. Additionally, or alternatively, customers 12 may indicate a successful closure/resolution for a call.

Network 14 may provide customers 12 (e.g., customer devices) with connectivity to call center 100. Network 14 may include one or more wired, wireless and/or optical networks that are capable of receiving and transmitting data and voice signals. For example, network 14 may include one or more public switched telephone networks (PSTNs) or other type of switched network. Network 14 may also include one or more wireless networks and may include a number of transmission towers for receiving wireless signals and forwarding the wireless signals toward the intended destination. Network 14 may further include one or more satellite networks, one or more packet switched networks, such as an Internet protocol (IP) based network, a local area network (LAN), a wide area network (WAN), an intranet, the Internet, or another type of network that is capable of transmitting telecommunications traffic (e.g., voice, video and/or data traffic). For example, network 14 may include one or more SIP-based networks, one or more H.323/H.225-based networks, or any other type of packet switched network that is capable of transmitting traffic from a source device to a destination device.

User device 16 may include a computer device. For example, user device 16 may include a laptop computer, a personal computer, a tablet computer, a workstation, or another type of computation or communication device. In one implementation, user device 16 may be used to communicate with devices in call center 100, such as call analysis system 160, to provide user input (e.g., call center manager input) and/or obtain call analyses. User device 16 may be included within call center 100 or connected to call center 100 (e.g., via network 14 or another network connection).

In FIG. 1, the particular arrangement and number of components of environment 10 are illustrated for simplicity. In practice there may be more customers 12, networks 14, and/or call centers 100. Additionally, call center 100 may include additional and/or different components than those indicated in FIG. 1. Components of environment 10 may be connected via wired and/or wireless links.

Figure 2:
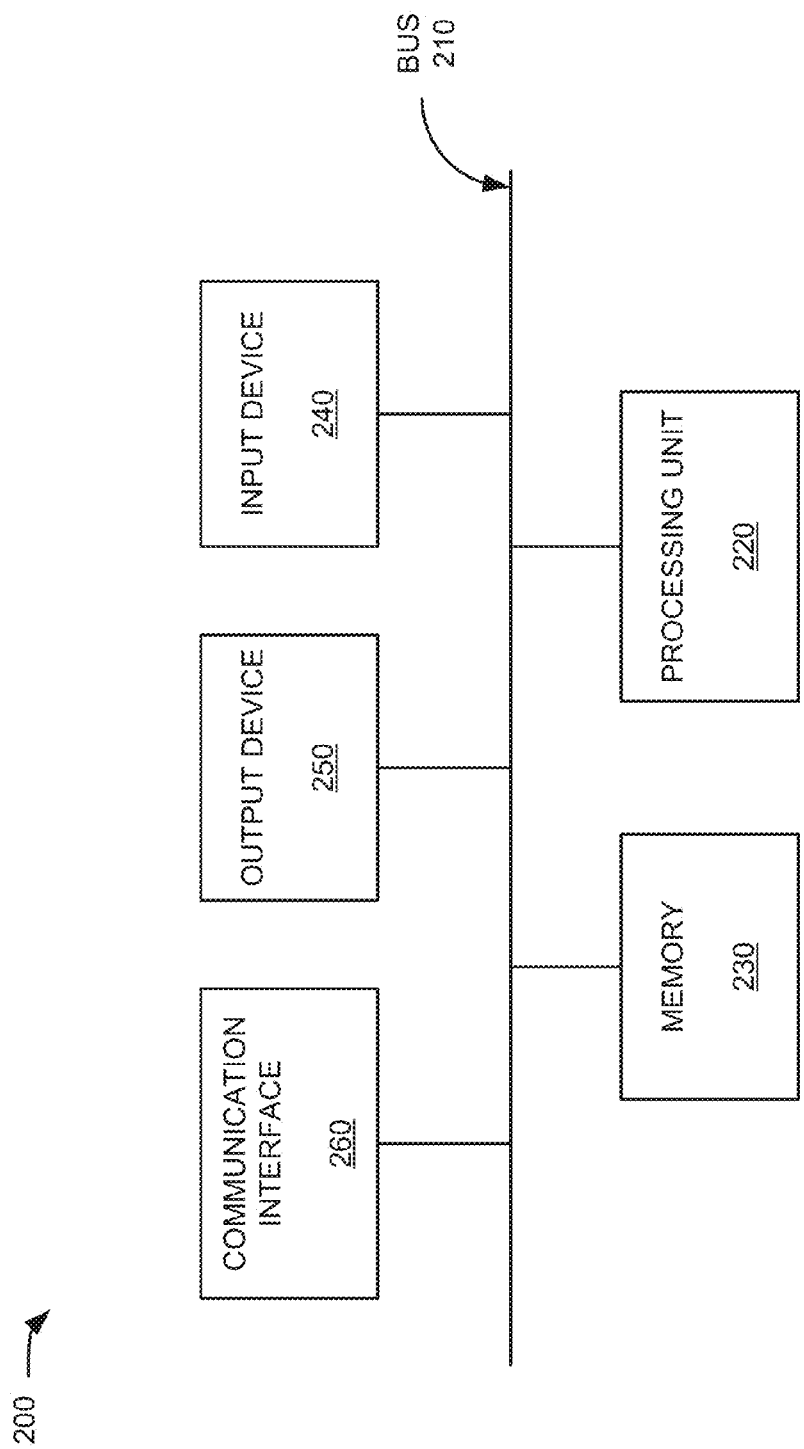
FIG. 2 is a block diagram of exemplary components of a device that may correspond to one of the devices of FIG. 1.

FIG. 2 is a diagram of exemplary components of a device 200. Each of call routing system 120, agent WSs 130, call data collector 140, call analysis system 160, and customer 12 devices may be implemented/installed as software, hardware, or a combination of hardware and software, on one or more of device 200. In one implementation, device 200 may be configured as a network device. In another implementation, device 200 may be configured as a computing device. As shown in FIG. 2, device 200 may include a bus 210, a processing unit 220, a memory 230, an input device 240, an output device 250, and a communication interface 260.

Bus 210 may permit communication among the components of device 200. Processing unit 220 may include one or more processors or microprocessors that interpret and execute instructions. In other implementations, processing unit 220 may be implemented as or include one or more application specific integrated circuits (ASICs), field programmable gate arrays (FPGAs), or the like.

Memory 230 may include a random access memory (RAM) or another type of dynamic storage device that stores information and instructions for execution by processing unit 220, a read only memory (ROM) or another type of static storage device that stores static information and instructions for the processing unit 220, and/or some other type of magnetic or optical recording medium and its corresponding drive for storing information and/or instructions.

Input device 240 may include a device that permits an operator to input information to device 200, such as a keyboard, a keypad, a mouse, a pen, a microphone, one or more biometric mechanisms, and the like. Output device 250 may include a device that outputs information to the operator, such as a display, a speaker, etc.

Communication interface 260 may include a transceiver that enables device 200 to communicate with other devices and/or systems. For example, communication interface 260 may include mechanisms for communicating with other devices, such as other devices of system 100.

As described herein, device 200 may perform certain operations in response to processing unit 220 executing software instructions contained in a computer-readable medium, such as memory 230. A computer-readable medium may include a tangible, non-transitory memory device. A memory device may include space within a single physical memory device or spread across multiple physical memory devices. The software instructions may be read into memory 230 from another computer-readable medium or from another device via communication interface 260. The software instructions contained in memory 230 may cause processing unit 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows exemplary components of device 200, in other implementations, device 200 may include fewer components, different components, differently arranged components, or additional components than depicted in FIG. 2. As an example, in some implementations, a display may not be included in device 200. In these situations, device 200 may be a "headless" device that does not include an input device. Alternatively, or additionally, one or more components of device 200 may perform one or more other tasks described as being performed by one or more other components of device 200.

Figure 3:
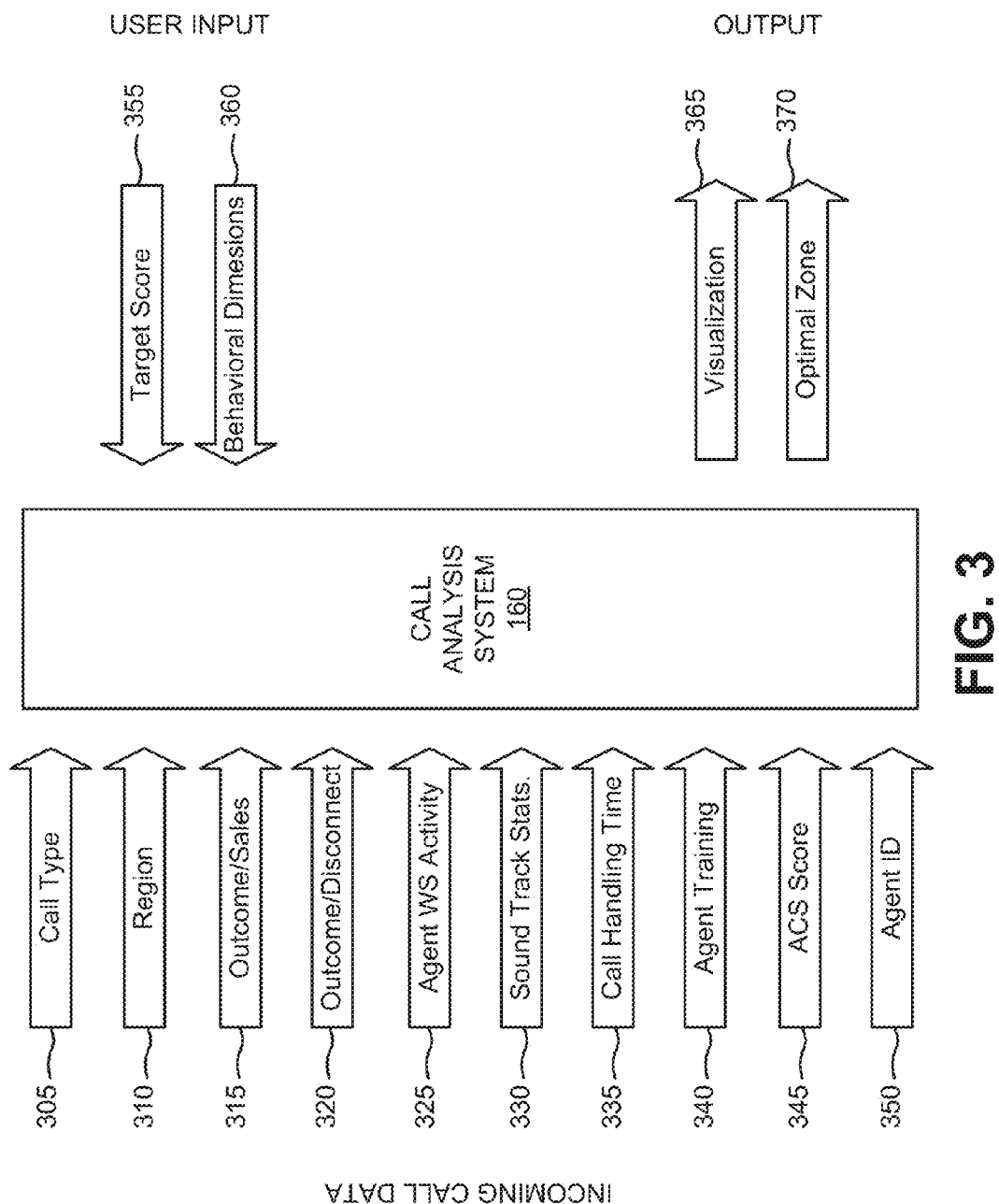
FIG. 3 is a block diagram of exemplary input/output for the call analysis system of FIG. 1.

FIG. 3 is a block diagram of exemplary input/output for call analysis system 160. Call analysis system 160 may receive incoming call data (e.g., from call database 150) and user input (e.g., from user device 16). Call analysis system 160 may provide output to, for example, user device 16. As shown in FIG. 3, call analysis system 160 may receive, for each call handled at an agent WS 130, a call type 305, a region 310, an outcome for sales calls 315, an outcome for disconnect calls 320, agent screen activity 325, sound track statistics 330, call handling time 335, agent training 340, ACS score 345, and an agent ID 350.

Call type 305 may include an indicator of a purpose or service category of a call from customer 12. Call type 305 may include, for example, a sales call, a customer service call, a service termination call, etc. Call type 305 may be identified, for example, based on a selection by customer interaction with an IVR unit prior to a call being routed to WS 130. In another implementation, call type 305 may be indicated by an agent handling a customer call.

Region 310 may indicate a service area for a customer call. Region 310 may be identified based on a caller ID of a customer user device, a billing address, or an indication of a customer. Outcome for sales calls 315 may include, for example, an indication of whether a sales call handled by an agent results in a sale to customer (e.g., closed or lost). Outcome for disconnect calls 320 may include, for example, an indication of whether a service termination call handled by an agent results in a customer being disconnected or retained.

Agent WS activity 325 may include a measure of an agents activity on a computer (e.g., WS 130) during a call. Agent WS activity 325 may be measured, for example, by tracking keyboard activity, mouse clicks, or other user interface monitoring. In another implementation, agent WS activity 325 may be based on screen refreshes or a combination of activity types. In another implementation, agent WS activity 325 may also be tracked through another input, such as customer or agent talk periods. Agent WS activity 325 may be represented, for example, as a percentage of total call time, as a ratio with talk time, or as a raw number.

Figure 4:
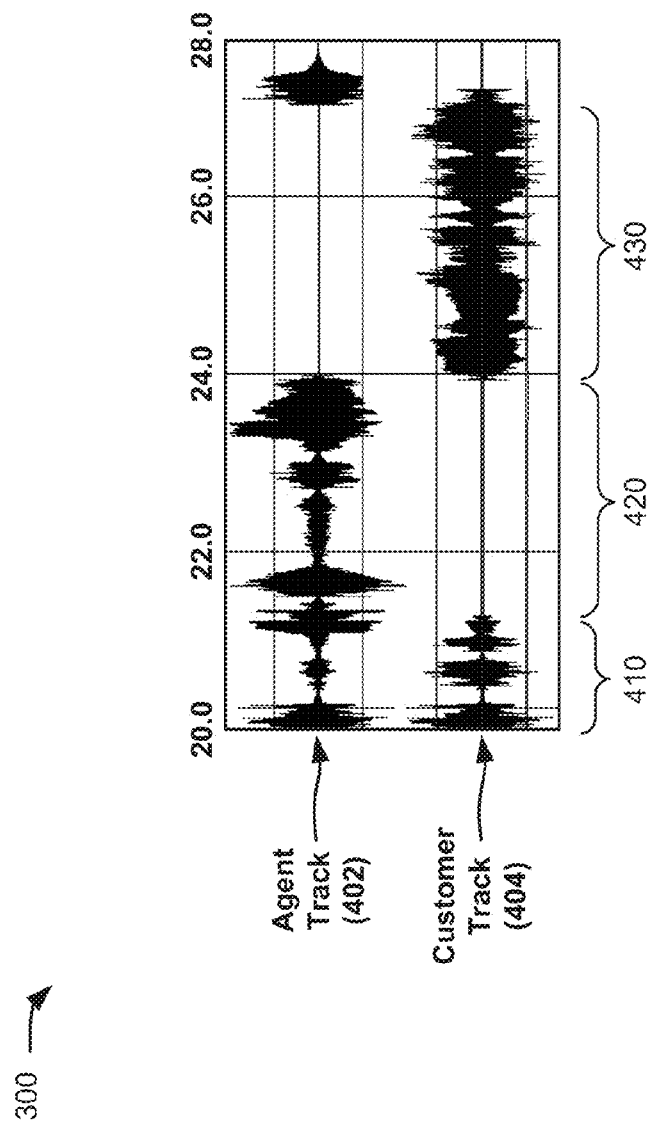
FIG. 4 is an illustration of call time monitor with silence detection.

Sound track statistics 330 may include data obtained by monitoring agent and customer voice input during a call. FIG. 4 provides an exemplary sound track portion 400 for a call to illustrate sound track statistics 330. As shown in FIG. 4, call sound track portion 400 may include an agent track 402 and a customer track 404. Each of agent track 402 and customer track 404 may include periods of talking (e.g., portions of tracks 402/404 shown with black waveforms) and periods of silence (e.g., portions of tracks 402/404 shown with no waveform). Sound track statistics 330 may include, for example, a measure of agent-to-customer talk time, a measure of customer-to-agent talk time, a measure of cross-talk time, silent time, and/or a ratio of a particular measured talk time against a total call time. Agent-to-customer talk time may be indicated, for example, at period 420 of call sound track portion 400. Customer-to-agent talk time may be indicated, for example, at period 430. Cross-talk (e.g., when both an agent and customer are speaking simultaneously) may be indicated, for example, at period 410. Sound track statistics 330 may be represented, for example, as a percentage of total call time, as a ratio with agent WS time, or as a raw number. In one implementation, individual voice tracks 402/404 may be analyzed using separate call managing software to provide a desired input metric for sound track statistics 330.

Returning to FIG. 3, call handling time 335 may include the total time an agent spends on a particular call (e.g., measured in seconds). Agent training 340 may include an experience level and/or training for a particular period. For example, an agent training may be measured for a rolling period (e.g., the last six months) relative to each call. In one implementation, agent training 340 may incorporate completed training hours by the agent for the relevant period. In another implementation, agent training may include an average close rate (for sales calls), an average retention rate (for disconnect calls), or another metric relevant to a particular call type 305.

ACS score 345 may include an after-call survey score for the particular call, if available. In one implementation, the ACS may be conducted by a separate system and/or third party service to solicit customer feedback after a completed call. Agent ID 350 may include a unique identifier for a particular agent using WS 130 to handle a call from a customer 12.

As further shown in FIG. 3, call analysis system 160 may receive user input to indicate a target score 355 for a desirable performance metric value and particular behavioral dimensions 360. Target score 355 may be an individual score or range of scores for a metric. The performance metric value may be for example, an ACS score, a first call resolution, a customer satisfaction rating, or another metric score. Generally, the target score may reflect a desirable performance output (by agents), but the desirable performance output may be difficult to match to a particular agent behavior needed to achieve the output. For example, an overall ACS rating of "very satisfied" may be difficult to associate with actionable agent behaviors required to consistently achieve that rating.

Behavioral dimensions 360 may include categories of measurable behavioral statistics that may be used to identify correlations. For example, behavioral dimensions 360 may include three different elements that are able to be controlled by agents during a call. Examples of behavioral dimensions 360 may include call handing time, agent-to-customer talk time, agent training, workstation activity time, and/or another measurable behavior. According to implementations described herein, three behavioral dimensions 360 may be provided by a user. In another implementation, call analysis system 160 may identify three behavioral dimensions from a larger group (four or more) of behavioral dimensions provided by a user. For example, if more than three behavioral dimensions 360 are provided, call analysis system 160 may apply data from call input records that have the desired target score 355 and determine which combination of behavioral dimensions 360 provides the best correlation for the desired target score.

Figure 6:
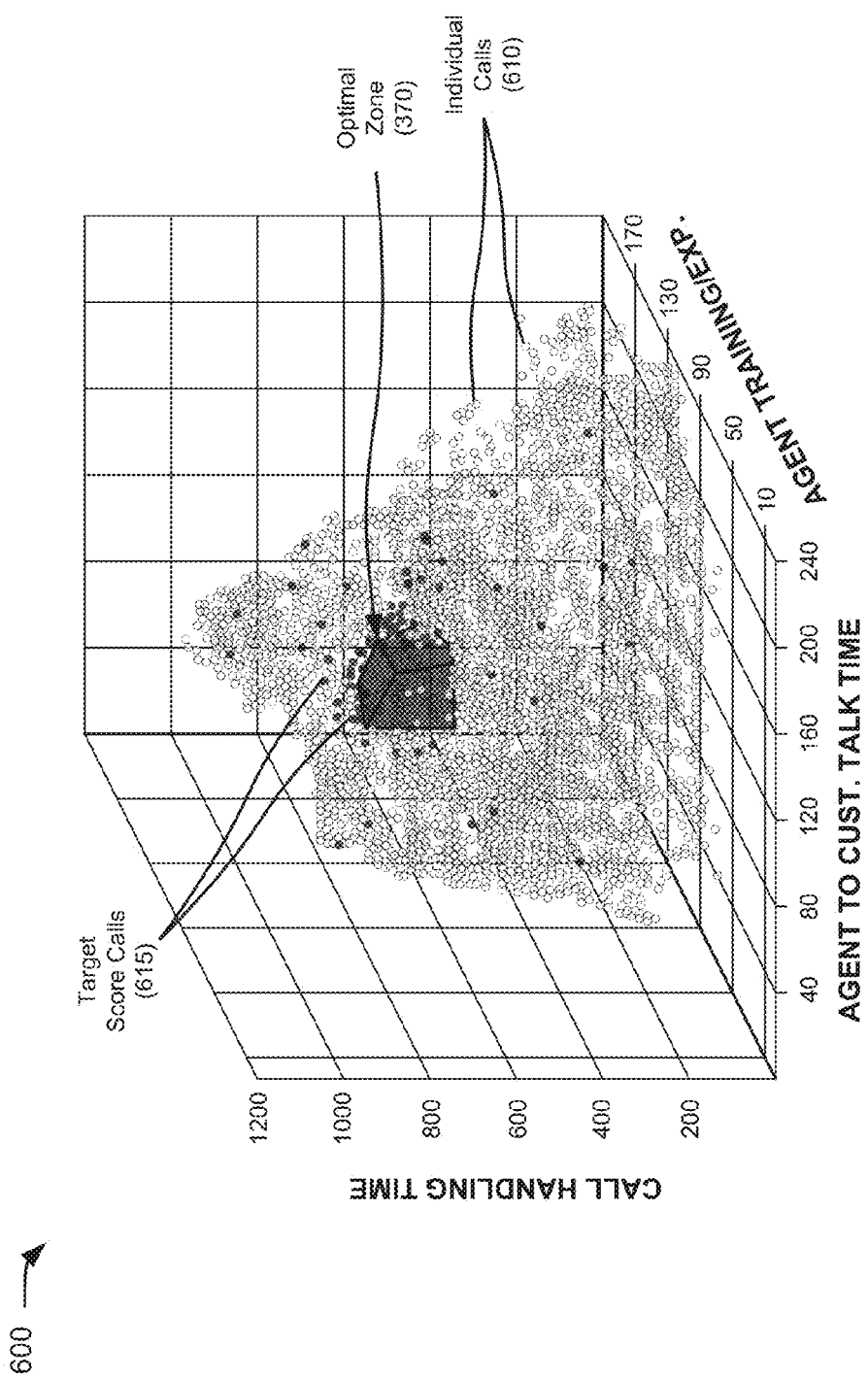
FIG. 6 is an illustration of an exemplary four-dimensional call analysis model, according to an implementation described herein.

As further shown in FIG. 3, call analysis system 160 may provide output to indicate a visual model 365 and an optimal zone 370 for agent behavior. Visual model 365 may include a three-dimensional plot of incoming call data against the three behavioral dimensions 360. For example, as shown in FIG. 6 and described further herein, individual calls may be plotted using incoming call data and based on the behavioral dimensions 360. In one implementation, the selected behavior dimensions 360 may be extracted from incoming call data for each call from a particular call type (e.g., call type 305) and/or region (e.g., region 310). Other incoming call data from the subset of relevant calls may then be used to plot each call against the behavioral dimensions 360.

An optimal zone 370 may be indicated based on visualization 365 (or data used to generate visualization 365). Optimal zone 370 may include, for example, a three-dimensional representation of scores for behavioral dimensions 360 that consistently provide calls with desired target score 355. Thus, optimal zone 370 may represent empirical data of calls that achieved desired target score 355. In one implementation, optimal zone 370 may be indicated with a color or another marking among other plotted calls.

Although FIG. 3 shows exemplary input and output data for call analysis system 160, in other implementations, call analysis system 160 process more, less, or different data than depicted in FIG. 3. Additionally or alternatively, some data input to or output by call analysis system 160 may be processed by an intermediate device.

Figure 5:
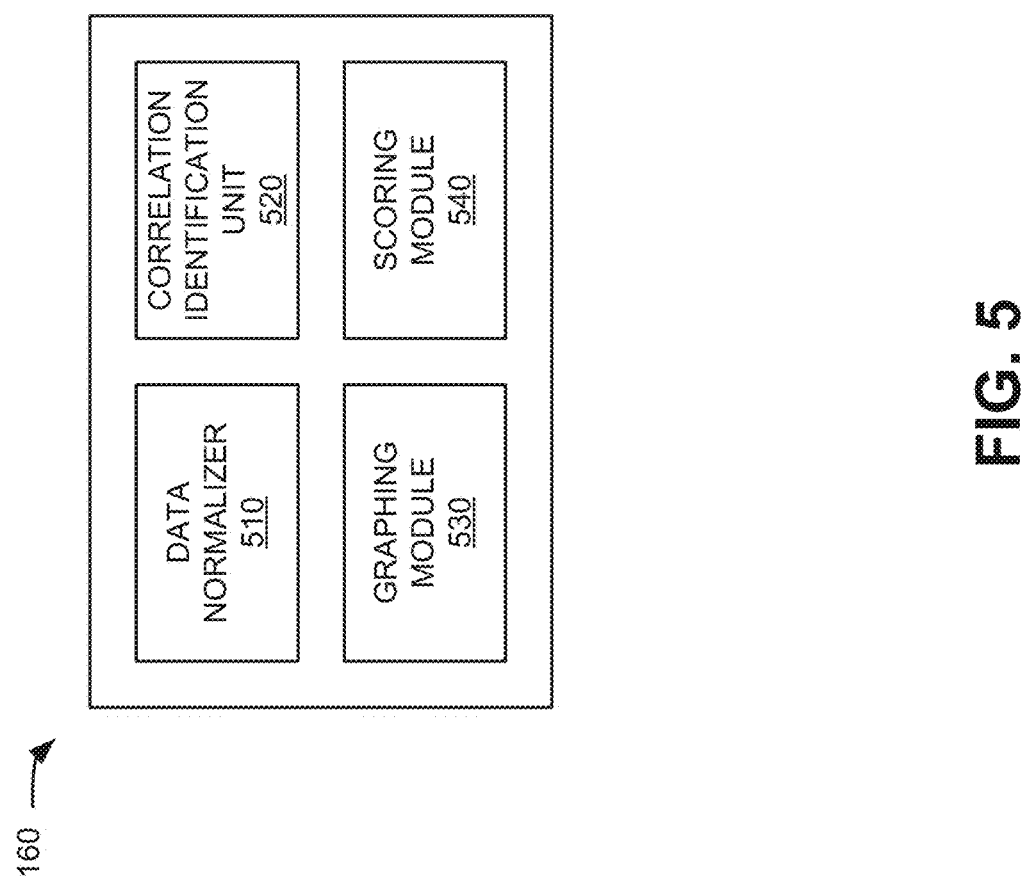
FIG. 5 is a block diagram of exemplary functional components of a call analysis system of FIG. 1.

FIG. 5 is a block diagram of exemplary functional components of call analysis system 160. The functions described in connections with FIG. 5 may be performed by one or more components of device 200 (FIG. 2). As shown in FIG. 5, call analysis system 160 may include a data normalizer 510, a correlation identification unit 520, a graphing module 530, and a scoring module 540.

Data normalizer 510 may process incoming call entries from call database 150 over a particular time interval. The time interval may be selected, for example, by a call center manager to obtain a relevant sample size. For example, a selected time interval may be about six month. In another implementation, data normalizer 510 may select a time interval to correspond to a desired sample size (e.g., as provided by a call center manager). If applicable, data normalizer 510 may filter relevant regions and/or call types to obtain a subset of call data that may be used by correlation identification unit 520.

Correlation identification unit 520 may determine a correlation or optimal zone for a desired target metric among given three dimensions. For example, given a target of a particular range of ACS scores and behavioral dimensions of (1) agent training, (2) call handling time, and (3) agent-to-customer talk time, correlation identification unit 520 may identify an optimal zone 370 that indicates the behavior dimension scores most likely to correspond to the target ACS scores. Any number of known techniques may be applied to determine optimal zone 370 based on plots of the individual calls having the necessary target score. In one implementation, optimal zone 370 may be defined by identifying a mean or median range for each of the three behavioral measures (e.g., call handling time, agent-to-customer talk time, and agent training/experience) of calls with the particular target score. In this implementation, the high and low ends of each range could represent boundaries of optimal zone 370. In other implementations, correlation identification unit 520 may identify statistically significant ranges of behavior measures (e.g., for the plotted calls with the particular target score) to determine optimal zone 370. In still another implementation, optimal zone 370 may be determined by applying a best fit of a particular zone volume to the plotted calls with the particular target score.

Alternatively, correlation identification unit 520 may identify three behavioral dimensions, from a group of dimensions, that provide the best correlation for a selected target zone. For example, given a target of a particular range of ACS scores and five behavioral dimensions, correlation identification unit 520 may identify optimal zones for six different combinations of three behavioral dimensions each. Correlation identification unit 520 may then determine which of the six combinations provides the best correlation to serve as optimal zone 370 for the particular range of ACS scores. In other implementations, correlation identification unit 520 may employ association rule learning, quantitative association rules, or other data correlation techniques to identify common dimensions of calls with desired target scores 355.

Graphing module 530 may generate a graphical representation of results from correlation identification unit 520. Graphing module 530 may also generate plots of data from individual calls generally and/or a subset of calls for a particular period, region, etc. FIG. 6 provides an illustration of an exemplary four-dimensional call analysis model 600, which may be generated by graphing module 530, according to an implementation described herein.

Referring to FIG. 6, graphical model 600 may include agent-to-customer talk time along a first dimension (e.g., x-axis), call handling time along a second dimension (e.g., y-axis), and agent training/experience along a third dimension (e.g., z-axis). Use of a fourth dimension, color, is described further herein. Individual calls 610 may be plotted based on data (e.g., as stored in call database 150) for the agent-to-customer talk time, the call handling time, and the agent training/experience for each call. Color may be used to differentiate scoring for individual calls 610. Calls with the desired target score 615 (e.g., an ACS score, FCR, etc.) may be plotted in a different color than other calls 610. Graphing module 530 may present optimal zone 370, as determined by correlation identification unit 520. Optimal zone 370 may generally be determined based on the plotted locations of target score calls 615. As shown in FIG. 6, individual calls 610 may be plotted to provide context for optimal zone 370. However, it should be understood that plots of individual calls 610 or 615 may not actually be presented to determine optimal zone 370. Although shown as an irregular cubic volume in FIG. 6, optimal zone 370 may take other forms as defined by the relative locations of target score calls 615.

Figure 7:
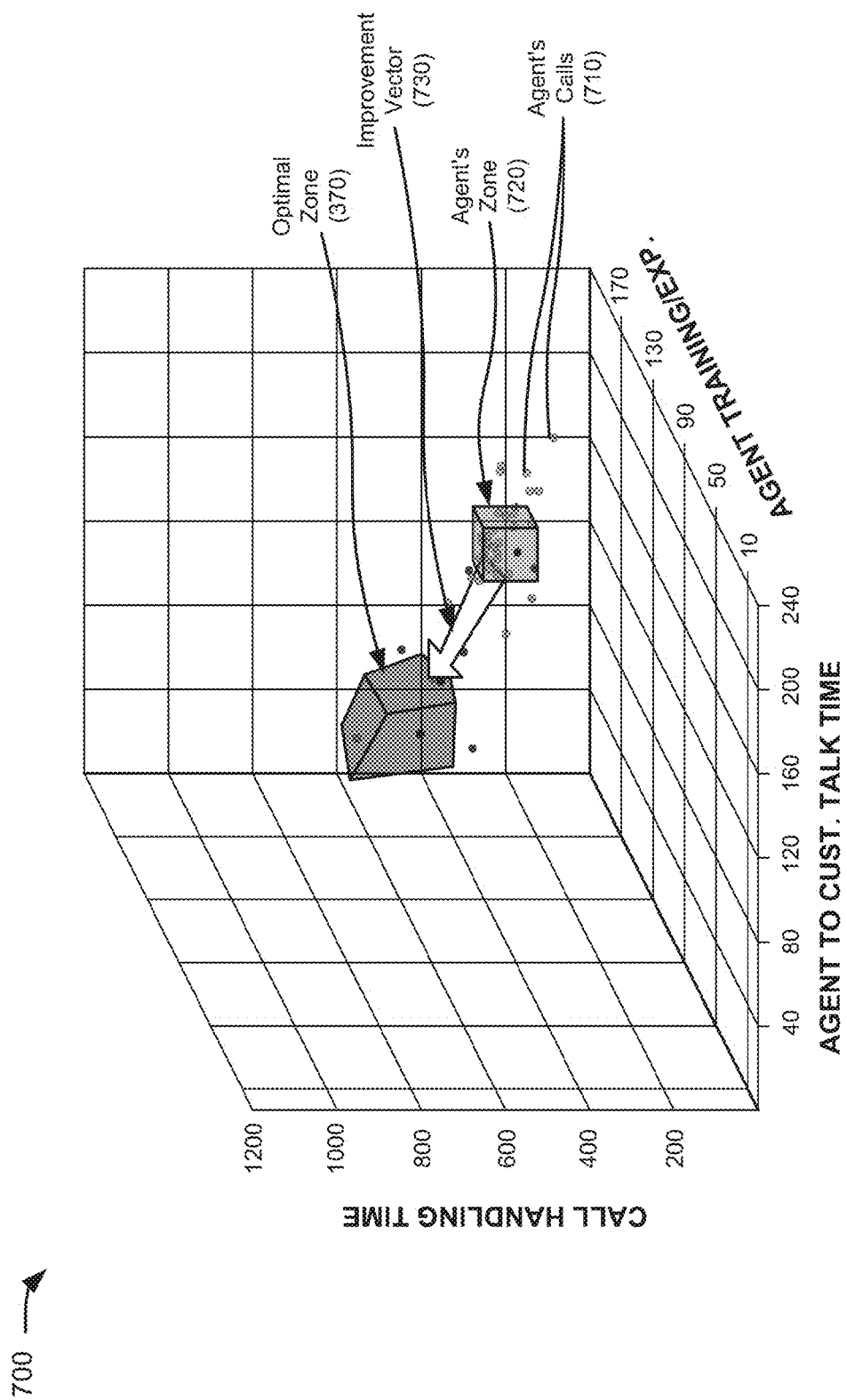
FIG. 7 is an illustration of an exemplary call analysis coaching model, according to an implementation described herein.

FIG. 7 provides an illustration of an exemplary call analysis coaching model 700 that may be generated by graphing module 530, according to an implementation described herein. Graphing module 530 may generate plots of data from individual calls 710 associated with a particular agent. Similar to graphical model 600 of FIG. 6, graphical model 700 may plot optimal zone 370 against agent-to-customer talk time along a first dimension (e.g., x-axis), call handling time along a second dimension (e.g., y-axis), and agent training/experience along a third dimension (e.g., z-axis). Color may be used to identify scoring (e.g., desirable ACS score, FCR, etc.) for individual agent's calls 710. Graphing module 530 may also present an agent's zone 720 relative to the position of optimal zone 370. Agent's zone 720 may generally be determined based on the plotted location of individual calls 710. Presenting agent's zone 720 relative to optimal zone 370 may enable a qualitative analysis to identify behavioral changes that an agent can implement to improve call performance.

In the example of FIG. 7, the position of agent's zone 720 relative to optimal zone 370 may indicate that the agent is talking too much, is not using the average allocated time for calls (e.g., giving too little time for customers to ask questions), and/or needs more training. In one implementation, graphing module 530 may provide an improvement vector 730 to provide a coaching indicator of behavioral changes that an agent may adopt to improve call scores (e.g., into the optimal zone). Improvement vector 730 may be presented as a single line in some implementations. In other implementations, improvement vector 730 may be presented with multiple vector components (e.g., x, y, and z axis components) to indicate, for example, relative weights of agent-to-customer talk time, call handling time, and agent training/experience that may benefit an agent's call handling performance.

Figure 8:
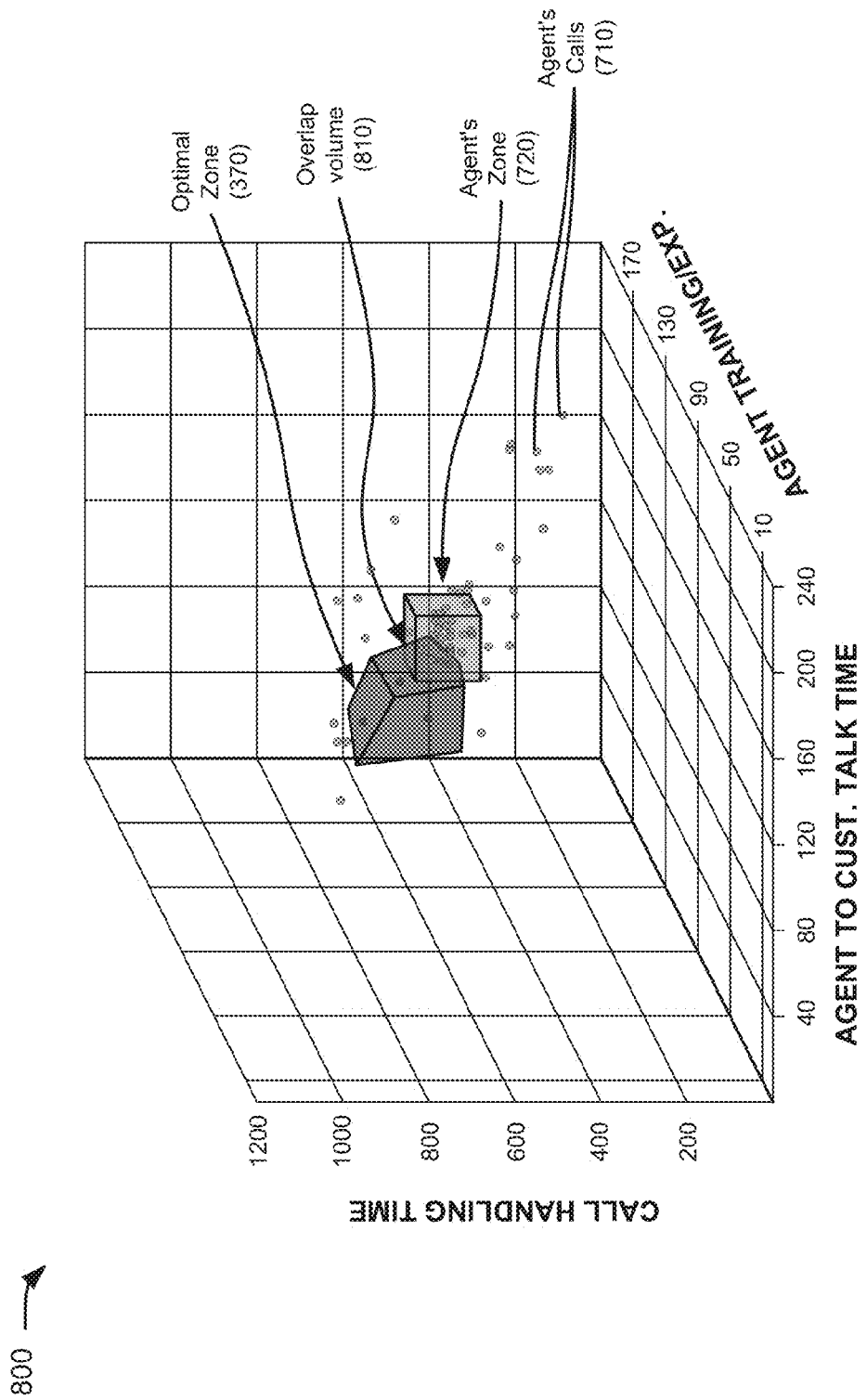
FIG. 8 is an illustration of another exemplary call analysis coaching model, according to another implementation described herein.

FIG. 8 provides an illustration of another exemplary call analysis coaching model 800 that may be generated by graphing module 530, according to an implementation described herein. Similar to graphical model 700 of FIG. 7, graphical model 800 may plot optimal zone 370 and agent's zone 720 (e.g., based on individual agent's calls 710) relative to each other. In the example of FIG. 8, optimal zone 370 and agent's zone 720 may intersect to indicate an overlap volume 810. In one implementation, overlap volume 810 may be used to provide a quantitative measure of an agent's performance. For example, overlap volume 810 may be presented as the percentage of the total volume of agent's zone 720 that intersects optimal zone 370 to provide a quantitative score for that agent.

Figure 11:
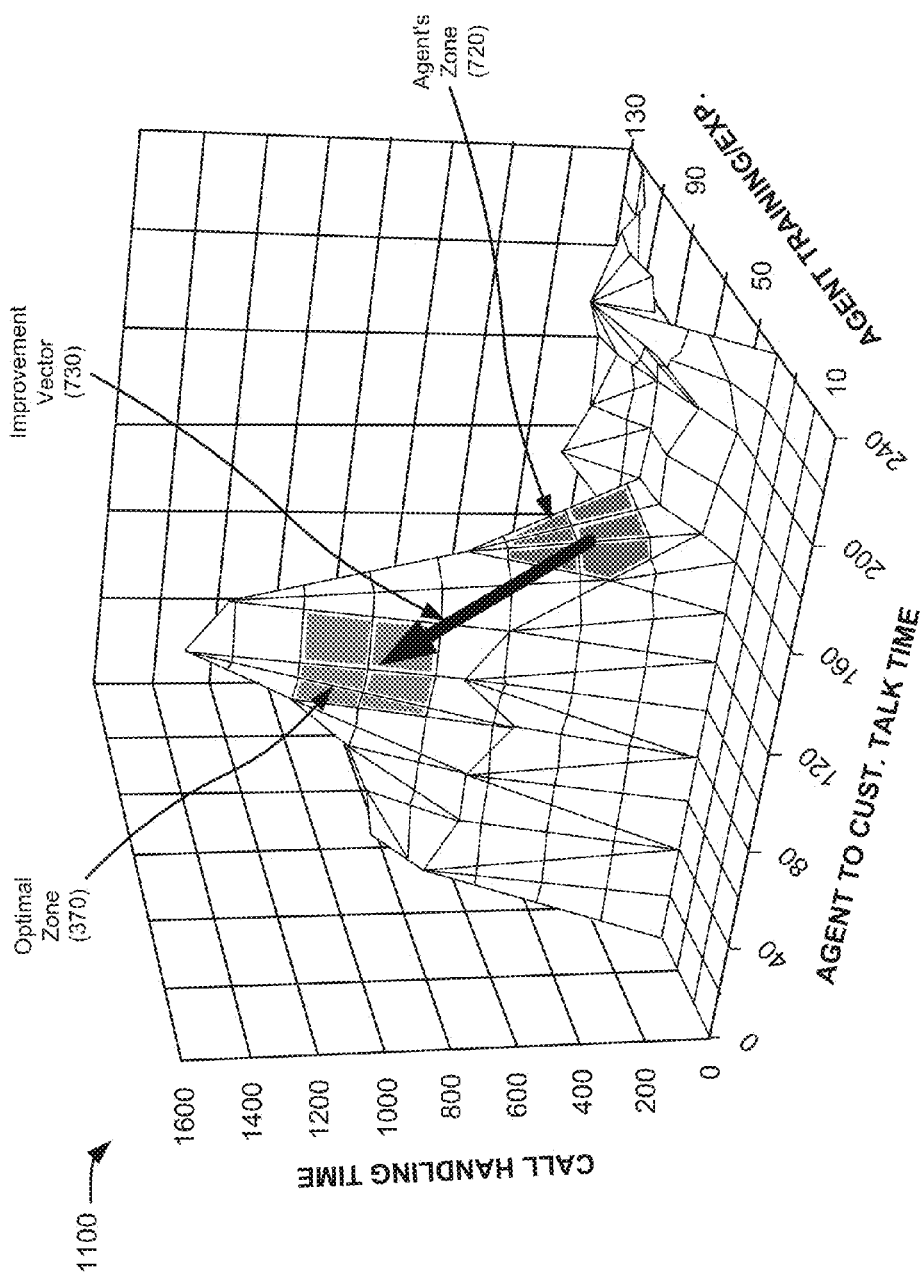
FIG. 11 is an illustration of an exemplary call analysis coaching model, according to another implementation described herein.

In the presentations of FIGS. 6-8, graphical models are shown in the form of a three-dimensional scatter graph. In other implementations, graphical model 600/700/800 may take other forms. For example, as shown in FIG. 11, graphical model 1100 may be provided in the form of a surface plot including optimal zone 370, agent's zone 720, and improvement vector 730. The surface plot could be obtained by flattening one dimension at a time as appropriate based on the nature of the data using transformation functions such as averages or weighted averages. For example, graphical model 1100 may be obtained, for example, by applying a transformation to one dimension (e.g., agent-to-customer talk, call handling time, and agent training/experience) of graphical model 700 to convert the data points cloud of graphical model 700 into a surface. The transformation function may include, for example, average or median as appropriate to the nature of the data. Other three-dimensional representations may also be used to implement features described herein.

Returning to FIG. 5, scoring module 540 may provide a quantitative analysis of an agent's performance. The quantitative analysis may provide measurable performance data for a particular agent relative to performance metric values defined by optimal zone 370. For example, referring to FIGS. 7 and 8, scoring module 540 may measure (1) an amount of overlap 810 between optimal zone 370 and agent's zone 720 or (2) the percentage of an agent's individual calls 710 that fall within optimal zone 370. Scoring module 540 may provide the quantitative analysis as raw scores or as rankings (e.g., relative to other agents' raw scores). The quantitative analysis may also permit monitoring agent improvement (e.g., month-over-month comparison). Thus, scoring module 540 may provide an alternative or additional quantitative analysis for agent performance beyond ACS scores or FCR indicators. Scoring module 540 may also enable analysis of calls that do not have other performance data (e.g., calls that do not have an ACS score).

Although FIG. 5 shows exemplary functional components of call analysis system 160, in other implementations, call analysis system 160 may include fewer components, different components, or additional components than depicted in FIG. 5. Alternatively, or additionally, one or more functional components of call analysis system 160 may perform one or more other tasks described as being performed by one or more other functional components of call analysis system 160.

Figure 9:
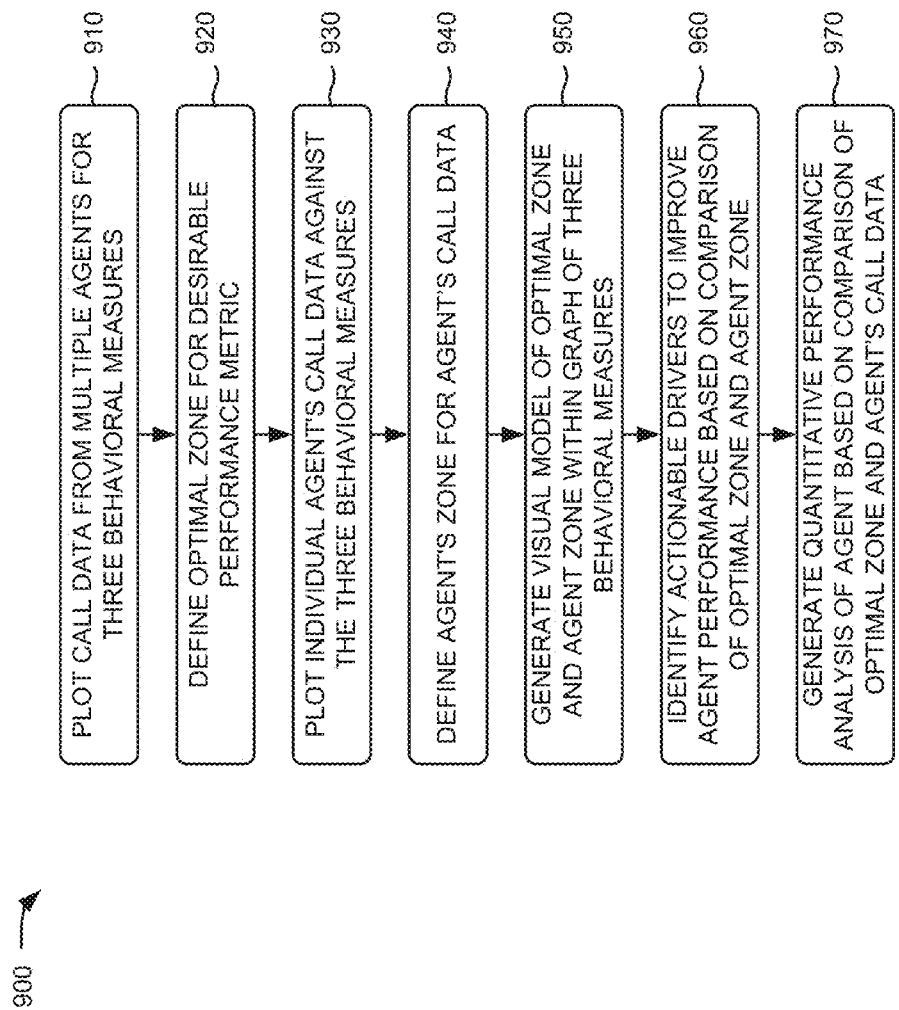
FIGS. 9 and 10 are flow diagrams of an exemplary process for analyzing call center agent performance, according to an implementation described herein.
Figure 10:
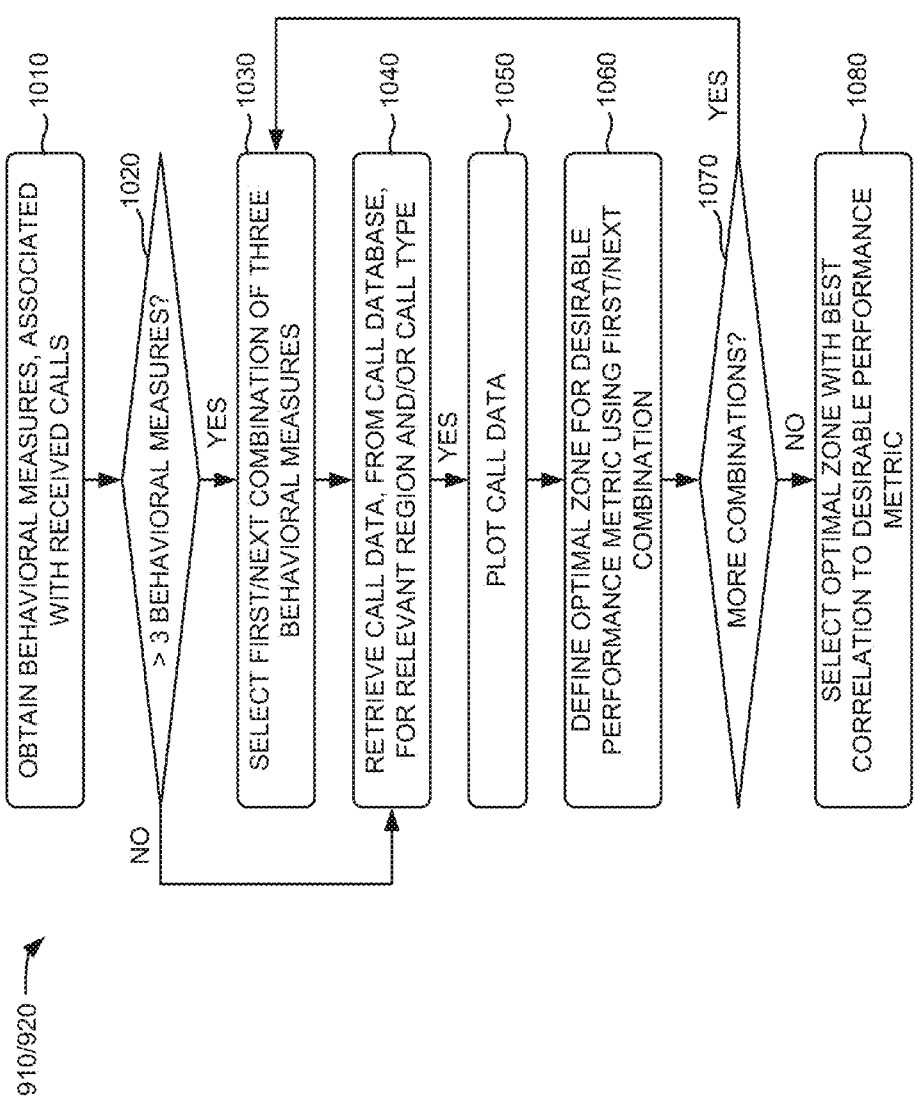

FIGS. 9 and 10 are flow diagrams of an exemplary process 900 for analyzing call center agent performance. In one implementation, process 900 may be performed by call analysis system 160. In other implementations, process 900 may be performed by call analysis system 160 and one or more other devices from call center 100 and/or user device 16.

Process 900 may include plotting call data from multiple agents for three behavioral measures (block 910) and defining an optimal zone for a desirable performance metric (block 920). For example, as shown in FIGS. 5 and 6, call analysis system 160 may obtain data from call center database 150. In one implementation, the call data may include data from multiple calls to multiple agents. In a different implementation, the call data may include data with a particular target score for a selected performance metric (e.g., a particular ACS score or range). Call analysis system 160 may plot individual calls having the necessary target score to identify optimal zone 370. Optimal zone 370 may then be determined based on plots of the individual calls having the necessary target score.

Process 900 may also include plotting an individual agent's call data against the three behavioral measures (block 930) and defining an agent's zone for the agent's call data (block 940). For example, as shown in FIGS. 5 and 7, each of an agent's call data for a relevant time period, region, and/or call type (e.g., based on call data extracted from call database 150) may be plotted against the three behavioral measures (e.g., call handling time, agent-to-customer talk time, and agent training/experience). In one implementation, the particular agent's call data may be plotted regardless of whether a corresponding ACS score (or other selected performance metric value) is available for each call. Call analysis system 160 may use the plotted agent's call data to determine agent's zone 720. In one implementation, agent's zone 720 may be determined using the same or similar techniques as those used to determine optimal zone 370.

Process 900 may also include generating a visual model of the optimal zone and the agent's zone within a graph of the three behavioral measures (block 950). For example, as described in connection with FIGS. 7, 8, and 11, call analysis system 160 may generate a visual three-dimensional representation of optimal zone 370 and the agent's zone 720 in the context of the three behavioral measures (e.g., call handling time, agent-to-customer talk time, and agent training/experience).

Process 900 may further include identifying actionable drivers to improve agent performance based on a comparison of the optimal zone and the agent's zone (block 960). For example, as described in connection with FIGS. 7 and 11, call analysis system 160 may generate an improvement vector 730. In one implementation, improvement vector 730 may provide a coaching indicator of behavioral changes that an agent may adopt to improve call scores (e.g., into the optimal zone). Improvement vector 730 may be presented as a single vector and/or with multiple vector components (e.g., x, y, and z axis components) to indicate relative weights of each behavioral measure.

Process 900 may additionally include generating a quantitative performance analysis of the agent based on a comparison of the optimal zone and the agent's call data (block 970). For example, as described in connection with FIGS. 7 and 8, call analysis system 160 may measure (1) an amount of overlap between optimal zone 370 and agent's zone 720 or (2) the percentage of an agent's individual calls 710 that fall within optimal zone 370. Call analysis system 160 may provide the quantitative analysis as raw scores or as rankings (e.g., relative to other agents' raw scores). Thus, call analysis system 160 may provide an alternative or additional quantitative analysis for agent performance, for example, for calls that do not have an ACS score.

Process blocks 910 and 920 may include the process blocks shown in FIG. 10. Referring to FIG. 10, process blocks 910/920 may include obtaining behavioral measure associated with received calls (block 1010). For example, call analysis system 160 may receive input (e.g., from a user of user device 16) identifying behavioral measures for a call analysis. In one implementation, the behavioral measures may correspond to particular data fields for call database 150. In one implementation, at least three behavioral measures may be identified.

Process blocks 910/920 may include determining if there are more than three behavioral measures available (block 1020). If there are more than three behavioral measures available (block 1020—YES), a first combination of three behavioral measures may be selected (block 1030). If there are not more than three behavioral measures available (block 1020—NO) or after a first combination of three behavioral measures are selected, call data may be retrieved from a call database for a relevant region and/or call type (block 1040), call data may be plotted (block 1050), and an optimal zone for the desirable performance metric value may be defined using the first combination (block 1060). For example, when more than three options of behavioral measures are available, call analysis system 160 may iteratively plot call data (e.g., retrieved from call database 150) for different combinations of three behavioral measures. Call analysis system 160 may determine an optimal zone 370 for each different combination of three behavioral measures.

Process blocks 910/920 may also include determining if there are more combinations of three behavioral measures available (block 1070). If more combinations are available (block 1070—YES), a next combination of three behavioral measures may be selected (block 1030) and process blocks 940-960 may be repeated. If no more combinations are available (block 1070—NO), an optimal zone with the best correlation of the desirable performance metric value may be selected (block 1080). For example, call analysis system 160 may perform statistical analysis to identify which combination of three behavioral measures provides the best correlation to the selected performance metric value.

Systems and methods described herein may obtain call data for multiple calls received at a call center and plots individual calls of the multiple calls, based on the call data, against three behavioral measures related to agent activities. The systems and methods may identify an optimal zone, among the plotted individual calls, for a selected performance metric value that is different than the three behavioral measures. The systems and methods may also plot a particular agent's calls, based on the call data, against the three behavioral measures and identifies an agent's zone, among the plotted agent's calls, for the selected performance metric value. The computing device generates a visual model of the optimal zone and the agent's zone within the context of the three behavioral measures. The optimal zone may indicate a correlation between the selected performance metric value and the three behavioral measures. In one implementation, the systems and methods may also provide, in the visual model, a vector indicating behavioral changes the agent can implement to improve performance. In other implementations, the systems and methods may generate a quantitative analysis of the particular agent's calls based on a number of the particular agent's calls that are plotted within the optimal zone, or an amount of overlap between the optimal zone and the agent's zone.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. For example, while series of blocks have been described with respect to FIGS. 9 and 10, the order of the blocks may be modified in other implementations. Further, non-dependent blocks may be performed in parallel.

It will be apparent that different embodiments described above may be implemented in many different forms of software, firmware, and hardware in the implementations illustrated in the figures. The actual software code or specialized control hardware used in the implementations does not limit the invention. Thus, the operation and behavior of these embodiments were described without reference to the specific software code—it being understood that software and control hardware can be designed to implement these embodiments based on the description herein.

Further, certain portions of the invention may be implemented as a "component" or "system" that performs one or more functions. These components/systems may include hardware, such as a processor, an ASIC, or a FPGA, or a combination of hardware and software.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the invention unless explicitly described as such. Also, as used herein, the article "a" and "one of" is intended to include one or more items. Further, the phrase "based on" is intended to mean "based, at least in part, on" unless explicitly stated otherwise.

What is claimed is:

1. A method, comprising:
    obtaining, by a computing device, call data for multiple calls received at a call center, the multiple calls being routed to multiple agents;
    plotting, by the computing device, individual calls of the multiple calls, based on the call data, against three behavioral measures, each of the three behavioral measures including elements that are able to be controlled by the multiple agents;
    identifying, by the computing device, an optimal zone, among the plotted individual calls, for a selected performance metric value over the three behavioral measures,
        wherein the optimal zone is defined by a range for each of the three behavioral measures of calls with the selected performance metric value, with boundaries of the optimal zone represented by a low end and a high end of each range, and
        wherein the selected performance metric value is different than the three behavioral measures;
    plotting, by the computing device, one of the agent's calls of the multiple calls, based on the call data, against the three behavioral measures;
    identifying, by the computing device, an agent's zone, among the plotted agent's calls, for the selected performance metric value, the agent's zone being graphically presented to identify a correlation of the three behavioral measures to the plotted agent's calls;
    generating, by the computing device, a visual model of the optimal zone and the agent's zone within the context of the three behavioral measures; and
    presenting, in the visual model and by the computing device, an improvement vector between the agent's zone and the optimal zone, the improvement vector indicating behavioral changes the agent can adopt to achieve call scores in the optimal zone, wherein the improvement vector includes components to indicate weights of the three behavioral measures between the agent's zone and the optimal zone.

2. The method of claim 1, wherein identifying the optimal zone further includes selecting the range for each of the three behavioral measures based on one or more of:
    a median range for each of the three behavioral measures the plotted calls with the selected performance metric value,
    and
    a best fit of a particular zone volume to the plotted calls with the selected performance metric value.

3. The method of claim 1, wherein presenting the improvement vector further comprises identifying in the visual model a component weight of each of the three behavioral measures in the vector.

4. The method of claim 1, wherein generating the model further includes:
    presenting, in the visual model, plots of all the one agent's calls for a particular period relative to the optimal zone.

5. The method of claim 1, further comprising:
    generating a quantitative analysis of the one agent's calls based on:
        a number of the one agent's calls that are plotted within the optimal zone, or
        an amount of overlap between the optimal zone and the agent's zone.

6. The method of claim 1, wherein obtaining the call data includes:
    identifying a subset of the call data based on one or more of:
        a region associated with the call,
        a service category associated with the call, and
        the selected performance metric value.

7. The method of claim 1, wherein the three behavioral measures include three of:
    a measurement of agent-to-customer talk time from call sound track statistics, during a call,
    a measurement of call handling time,
    a measurement of an agent's experience or training,
    a measurement of an agent's activity time on a workstation during a call,
    a measurement of an agent's silent time, from call sound track statistics, during a call, or
    a measurement of customer-to-agent talk time, from call sound track statistics, during a call.

8. The method of claim 1, wherein the three behavioral measures include one or more measurements derived from call sound track statistics including:
    agent-to-customer talk time during a call,
    customer-to-agent talk time during the call,
    cross-talk time during the call, and
    silent time during the call.

9. The method of claim 1, wherein the selected performance metric value includes one of a target after call survey (ACS) score or a first call resolution (FCR) indication.

10. The method of claim 1, further comprising:
    selecting, by the computing device and from a group of four or more behavioral measures, different combinations of three of the group of four or more behavioral measures; and
    identifying, by the computing device and from the different combinations, the three behavioral measures that provide a best correlation for the selected performance metric value.

11. The method of claim 10, wherein the three behavioral measures are selected based on providing a best correlation between the selected performance metric value and the three behavioral measures.

12. The method of claim 1, wherein the optimal zone represents empirical data of calls, from the multiple calls, that achieved a performance level for the selected performance metric value.

13. The method of claim 1, wherein the agent's zone indicates a statistically-significant region of the plotted agent's calls.

14. A computing device, comprising:
a memory to store a plurality of instructions; and
a processor configured to execute instructions in the memory to:
retrieve call data for multiple calls received at a call center, the multiple calls being routed to multiple agents;
plot individual calls of the multiple calls, based on the call data, against three behavioral measures, each of the three behavioral measures including elements that are able to be controlled by the multiple agents;
identify an optimal zone, among the plotted individual calls, for a selected performance metric value that is different than the three behavioral measures,
wherein the optimal zone is defined by a range for each of the three behavioral measures of calls with the selected performance metric value, with boundaries of the optimal zone represented by a low end and a high end of each range, and
wherein the selected performance metric value is different than the three behavioral measures;
plot one agent's calls received at the call center, based on the call data, against the three behavioral measures;
generate a visual model of the optimal zone and the agent's calls within the context of the three behavioral measures; and
present, in the visual model, an improvement vector between the agent's zone and the optimal zone, the improvement vector indicating behavioral changes the agent can adopt to achieve call scores in the optimal zone, wherein the improvement vector includes components to indicate weights of the three behavioral measures between the agent's zone and the optimal zone.

15. The device of claim 14, wherein, when identifying the optimal zone, the processor is further configured to execute instructions in the memory to:
select the range for each of the three behavioral measures based on one or more of:
a median range for each of the three behavioral measures the plotted calls with the selected performance metric value,
and
a best fit of a particular zone volume to the plotted calls with the selected performance metric value.

16. The device of claim 14, wherein, when plotting individual calls of the multiple calls, the processor is configured to plot calls with call data including the selected performance metric value; and
wherein, when plotting the one agent's calls, the processor is further configured to plot calls with call data including the selected performance metric value and without call data including the selected performance metric value.

17. The device of claim 16, wherein the selected performance metric value includes:
a target after call survey (ACS) score, or
a first call resolution (FCR) indication.

18. The device of claim 14, wherein the three behavioral measures associated with call center agents are selected from a group of behavioral measures including:
agent-to-customer talk time,
call handling time,
an agent's experience or training,
workstation activity during a call, or
customer-to-agent talk time.

19. A non-transitory computer-readable medium, storing instructions executable by one or more processors, the non-transitory computer-readable medium comprising one or more instructions to:
receive first call data for multiple calls to multiple agents received at a call center, wherein the first call data for each of the multiple calls includes a target performance metric value and three behavioral measures;
plot individual calls of the multiple calls, based on the first call data, using the three behavioral measures, each of the three behavioral measures including elements that are able to be controlled by the multiple agents;
identify an optimal zone, among the plotted individual calls, for a selected performance metric value that is different than the three behavioral measures,
wherein the optimal zone is defined by a range for each of the three behavioral measures of calls with the selected performance metric value, with boundaries of the optimal zone represented by a low end and a high end of each range, and
wherein the selected performance metric value is different than the three behavioral measures;
receive second call data for a particular agent's calls received at the call center, wherein the second call data for each of the particular agent's calls includes the three behavioral measures;
plot the particular agent's calls, based on the second call data, against the three behavioral measures;
generate a visual model of the optimal zone and the agent's calls within the context of the three behavioral measures; and
present, in the visual model, an improvement vector between the agent's zone and the optimal zone, the improvement vector indicating behavioral changes the agent can adopt to achieve call scores in the optimal zone, wherein the improvement vector includes components to indicate weights of the three behavioral measures between the agent's zone and the optimal zone.

20. The non-transitory computer-readable medium of claim 19, further comprising one or more instructions to:
select the range for each of the three behavioral measures based on one or more of:
a median range for each of the three behavioral measures the plotted calls with the selected performance metric value,
and
a best fit of a particular zone volume to the plotted calls with the selected performance metric value.

* * * * *